US012784558B2

(12) United States Patent
Fazel et al.

(10) Patent No.: US 12,784,558 B2
(45) Date of Patent: Nov. 3, 2026

(54) SAFETY SENSORS

(71) Applicant: M&R Technology, Inc., San Diego, CA (US)

(72) Inventors: Magid Fazel, San Diego, CA (US); Jerker Taudien, Shelburne, VT (US); Milorad Mike Terzic, Carlsbad, CA (US)

(73) Assignee: M&R Technology, Inc., San Diego, CA (US)

( * ) Notice: Subject to any disclaimer, the term of this patent is extended or adjusted under 35 U.S.C. 154(b) by 98 days.

(21) Appl. No.: 19/028,871

(22) Filed: Jan. 17, 2025

(65) Prior Publication Data

US 2025/0166475 A1 May 22, 2025

Related U.S. Application Data

(63) Continuation of application No. 18/211,617, filed on Jun. 20, 2023, now Pat. No. 12,288,453, which is a continuation of application No. 17/450,671, filed on Oct. 12, 2021, now Pat. No. 11,830,334, which is a continuation of application No. PCT/US2021/047108, filed on Aug. 23, 2021, and a continuation of application No. 17/122,088, filed on Dec. 15, 2020, now abandoned.

(60) Provisional application No. 62/706,548, filed on Aug. 24, 2020.

(51) Int. Cl.
*G08B 13/18* (2006.01)
*G08B 13/183* (2006.01)

(52) U.S. Cl.
CPC .................................. *G08B 13/183* (2013.01)

(58) Field of Classification Search
CPC .................................................... G08B 13/183
USPC .......................................................... 340/552
See application file for complete search history.

(56) References Cited

U.S. PATENT DOCUMENTS 3,742,437 A 6/1973 Thiele
3,825,916 A * 7/1974 Steele .................. G08B 13/183
340/557

(Continued)

OTHER PUBLICATIONS

PCT International Search Report and Written Opinion of International Patent Application PCT/US2021/047108, mailed Dec. 3, 2021, 12 pages, International Searching Authority (US).

(Continued)

*Primary Examiner* — Travis R Hunnings
(74) *Attorney, Agent, or Firm* — Dinsmore & Shohl LLP

(57) ABSTRACT

Disclosed are garage door sensor systems and devices that include one or more transmitter sources configured to transmit an electromagnetic (EM) waveform and a plurality of receiver circuits configured to receive the electromagnetic waveform from a plurality of corresponding transmitter sources. Each of the plurality of receiver circuits and transmitter sources are configured to share a wired connection to a garage door motor assembly. According to some implementations the wired connection is configured to be coupled a low voltage power source of the garage door motor assembly. The receiver circuit is configured to send a blocked beam signal that indicates to the garage door motor assembly that an obstruction is in the signal path between the transmitter source and a receiver sensor of the receiver circuit.

19 Claims, 13 Drawing Sheets

(56) References Cited

U.S. PATENT DOCUMENTS

| | | | | | |
|---|---|---|---|---|---|
| 4,978,942 | A * | 12/1990 | Bruce | G08B 13/183 340/693.8 |
| 5,656,900 | A * | 8/1997 | Michel | E05F 15/43 49/25 |
| 6,064,862 | A | 5/2000 | Grenon et al. | |
| 6,806,811 | B1 * | 10/2004 | Readler | G08B 13/126 340/552 |
| 7,787,776 | B2 | 8/2010 | Sharma | |
| 8,629,771 | B2 | 1/2014 | Anderson et al. | |
| 9,105,169 | B2 * | 8/2015 | Hanning | G08B 13/19 |
| 10,055,959 | B1 * | 8/2018 | Russell | G01S 13/0209 |
| 10,997,833 | B1 | 5/2021 | Fazel et al. | |
| 2003/0008669 | A1 | 1/2003 | Stein et al. | |
| 2005/0184695 | A1 * | 8/2005 | Chen | E05F 15/41 318/16 |
| 2005/0210529 | A1 | 9/2005 | Pavlic et al. | |
| 2006/0220971 | A1 | 10/2006 | Sato et al. | |
| 2008/0030328 | A1 | 2/2008 | Sharma | |
| 2008/0031206 | A1 | 2/2008 | Sharma | |
| 2008/0157965 | A1 * | 7/2008 | Shahar | G01V 8/20 340/556 |
| 2008/0305753 | A1 | 12/2008 | Stark | |
| 2013/0155027 | A1 | 6/2013 | Holmgren et al. | |
| 2013/0245374 | A1 | 9/2013 | Kunz et al. | |
| 2015/0091728 | A1 * | 4/2015 | Hanning | G08B 13/184 340/552 |
| 2016/0050062 | A1 | 2/2016 | Moher et al. | |
| 2016/0343223 | A1 * | 11/2016 | Noone | G01V 8/20 |
| 2021/0131941 | A1 * | 5/2021 | Zhang | A01C 7/105 |

OTHER PUBLICATIONS

LiftMaster, Website for Product LC-36A, https://www.liftmaster.com/lc-36a-safety-light-curtains-commercial-security/p/LC-36A, Original Publication Date Unknown.
LiftMaster, "LC-36A Light Curtain," Product Sell Sheet, Original Publication Date Unknown.
LiftMaster, "LiftMaster Light Curtain Model LC-36A," Installation Manual, 12 pages, Original Publication Date Unknown.
Kuswandi et al., "Smart packaging: sensors for monitoring of food quality and safety," Sensing and Instrumentation for Food Quality and Safety, Nov. 30, 2011, pp. 137-146, vol. 5, Springer Nature, DOI: 10.1007/s11694-011-9120-x.

* cited by examiner

SAFETY SENSORS

CROSS REFERENCE TO RELATED APPLICATIONS

The present application is a continuation of U.S. application Ser. No. 18/211,617, filed on Jun. 20, 2023, which is a continuation of U.S. application Ser. No. 17/450,671, filed on Oct. 21, 2021, which is a continuation of U.S. application Ser. No. 17/122,088, filed on Dec. 15, 2020, which claims priority to U.S. Provisional Patent Application Ser. No. 62/706,548, filed on Aug. 24, 2020. U.S. application Ser. No. 17/450,671 additionally claims priority to and is a continuation of International Application No PCT/US2021/047108, filed on Aug. 23, 2021, which claims priority to U.S. Provisional Patent Application Ser. No. 62/706,548, filed on Aug. 24, 2020. The entire disclosure of each of the above referenced Applications is hereby incorporated by reference in their entirety.

FIELD

Embodiments of the disclosure are directed to the field of safety sensors, and in particular in the field of sensors using electromagnetic waveforms to detect an object within their path.

BACKGROUND OF THE DISCLOSURE

Communications using an electromagnetic (EM) waveform are well-known in the art. In many applications, the communication rests on whether an EM waveform, such as a beam of light, for example infrared (IR) light, emitted by a transmitter is received by the receiver without any break in the transmission. When the transmission is blocked, then the receiver sends a signal to a main central processing unit (CPU) and whatever action that is preprogramed in the CPU would follow. Several examples include security devices, for example at museums, where a blocking of the EM waveform indicates the presence of an unauthorized intruder, or with garage door openers, where a blocking of the waveform indicates the presence of an object in the path of the garage door.

While EM waveform communications have revolutionized the safety and security industry, there exist several significant gaps in their operation. First, the currently available EM waveforms provide a line protection. That is, each EM waveform is transmitted by a single transmitter and received by a single, dedicated receiver. If an object is present in any space other than inside the path of the beam, then the beam is not blocked, and the object is not recognized.

As an example, today's garage door safety sensors use a single beam to detect objects, such as wheels of a vehicle, in the lower part of the garage doorway. They do not detect objects anywhere else in the garage doorway such as the bumper of a vehicle or an open rear door of a van. Garage door closing on the open hatchback or the bumper can cause costly dents and scratches. Second, each EM waveform is a continuous waveform carrying no information. In these cases, the recognition step is binary: either the light is received or is not received. Sophisticated thieves have learned how to alter the path of the beam such that an object can cross where the EM waveform should have been, but the beam is rerouted to the receiver and no block in the beam is identified.

These and other shortcomings of the current system have led to the need for a safety sensor that can detect an object crossing an imaginary surface, as opposed to crossing a line.

SUMMARY

Disclosed are systems comprising: a transmitter background; a receiver background; a plurality of transmitter units affixed on the transmitter background, each transmitting an encoded electromagnetic (EM) waveform, wherein the electromagnetic waveform is transmitted as a wide beam; and a plurality of receiver units affixed on the receiver background, wherein each of the plurality of the transmitter units is in electromagnetic communication with at least two of the receiver units.

Also disclosed are methods of identifying the presence of an object intersecting a spatial surface, the methods comprising: transmitting a plurality of waveforms, optionally non-simultaneously, using a plurality of transmitter units, each wide beam transmitted by a transmitter unit; receiving the plurality of the coded wide beams by a plurality of receiver units, each receiver unit receiving two or more waveforms within the plurality of the wide beams; determining if at least one receiver unit did not receive at least one waveform from one transmitter; and sending a signal identifying that an object is intersecting a spatial surface.

Further, a housing for the system is disclosed.

DETAILED DESCRIPTION OF THE EMBODIMENTS

Figure 1:
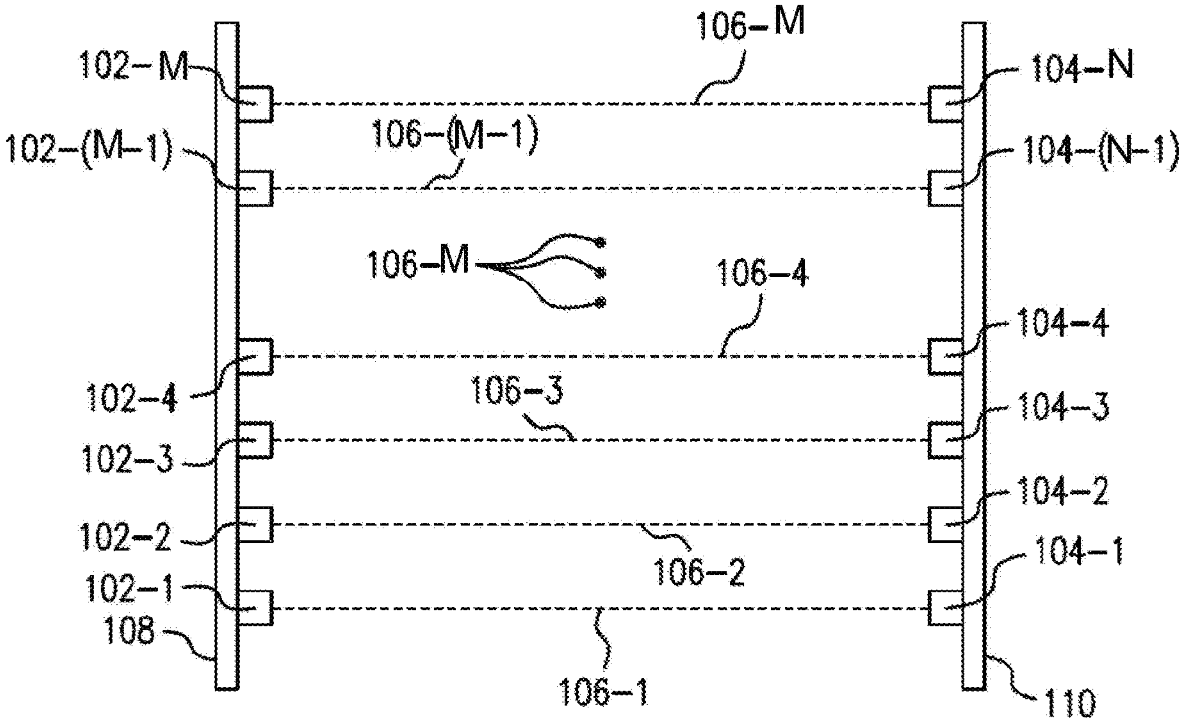
FIG. 1 is a drawing showing a plurality of one-to-one, narrow beam, EM communications.

The following components have received the below numerical designations in the drawings:

102: Transmission unit, TX, Narrow Beam
104: Receiver unit, RX, Narrow Beam
106: Coded EM waveforms
108: Transmitter background
110: Receiver background
202: Transmission unit, TX, Wide
204: Receiver unit, RX, Wide
206: Coded EM Wide Beams
300: Top level block diagram
302: Power source
304: Wires
306: TX voltage converter
308: RX voltage converter
310: EM Transmit LED.
312: EM receiver
314: Transmitter User Indicator LED.
316: Receiver User Indicator LED
318: TX micro-controller
320: RX micro-controller
800: Housing
802: Body of housing
804: Lid of housing
806: Hollow interior of housing
808: Openings in a wall of housing
902,904: Right and left walls of the body, respectively
908,910: Bottom grooves
912,914: Grooves in the wall
916,918: Top grooves
1002,1004: Right and left walls of the lid, respectively
1006,1008: Notches on the lid Disclosed herein are sensors that use electromagnetic (EM) waveforms that create a curtain of beams defining a surface, where the sensors detect when an object crosses the curtain/surface defined by the beams. The EM waveforms used with the devices and methods described herein can be any waveform from the electromagnetic spectrum, e.g., radio waves, infrared (IR) light, visible light, ultraviolet (UV) light, X-rays, and the like. Typically in sensors, but without any limitation on the scope of the present disclosure, IR, near IR, or a combination of red and IR light, are used. When the path of one beam is blocked, other units in the system check to see if the blocking is an artificial anomaly or if there actually is an object blocking the path.

Throughout the present disclosure, a "waveform" is an EM wave that is sent by the transmitter and received by the receiver. A "beam" is the three dimensional space within which the waveform travels.

In some embodiments, the sensors are used as a plurality of units that work cooperatively together. This is a different set up, as discussed in greater detail below, than just a collection of single narrow beam sensors. Each sensor transmits a wide beam of EM waveform towards a plurality of receivers, the waveform to be detected by the plurality of the receivers. The main CPU for the system checks to see if the received codes of the waveforms from the various sensors are as expected.

In the context of the present disclosure, a "system" comprises a plurality of TXs and a plurality of RXs that work cooperatively to provide sensing protection in one area. For example, a plurality of TX and a plurality of RX units assembled to provide a curtain protection for one garage door are collectively a "system." Within a system, there may be the same number of RXs as TXs, or more RXs than TXs, or more TXs than RXs. In other words, there need not be the same number of RXs and TXS in the same system.

Thus, in one aspect, disclosed herein are sensor systems comprising a plurality of transmitter units and a plurality of receiver units, wherein each transmitter unit is in EM communication with two or more receiver units.

By "electromagnetic communication" or "EM communication" throughout the present disclosure it is meant communication using an electromagnetic waveform. Thus, communications using IR, UV, or radio waves are considered EM communications. By being "in EM communication" it is meant that the two objects are communicating by EM communication.

"EM" in the context of the present disclosure refers to "electromagnetic" or "electromagnetic waveform," depending on the context. Thus, for example, an "EM emitter diode" is a diode that emits an electromagnetic waveform. An "EM beam" refers to an EM waveform within a beam. Thus, for example, "EM beam 106-1" means the EM waveform within the beam 106-1.

Typically, an EM waveform is transmitted in the shape of a cone. In some embodiments, the cone is very narrow such that the cone appears as a straight line beam, which herein is also referred to herein as "narrow beam." In other embodiments, the cone is wide such that it appears as a three dimensional cone (also referred to herein as "wide beam"). The term "beam" without more refers to any of a straight line (narrow beam), a two dimensional wedge, or a three dimensional cone (wide beam).

In still other embodiments, the beam appears as a two dimensional "wedge," which is a lengthwise cross-section of a cone. The POSITA recognizes that a wedge beam, even though it is identified as a 2-D cross section of a cone, is itself a cone whose widthwise cross section is an elongated ellipse. Thus, in these embodiments, the wedge is also considered a wide beam. The present disclosure discusses the beams in terms of a narrow beam or a wide beam, and the expression "wide beam" includes both cones and wedges.

In some embodiments, the EM communication is one-to-one, whereas in other embodiments, the EM communication is one-to-all, and in still other embodiments, the communication is one-to-many. By "one-to-one" communication it is meant that each transmitter is in EM communication with only one other receiver unit. Currently available sensors on garage door openers or security systems feature only one transmitter and one receiver to result in a one-to-one communication. By "one-to-all" communication it is meant that each transmitter unit is in EM communication with all the receiver units, and conversely, each receiver unit is in EM communication with all the transmitter units. Similarly, some system embodiments disclosed herein feature a "one-to-many" communication, which means that each transmitter unit is in EM communication with a plurality, but not all, of the receiver units, and vice versa, each receiver unit is in EM communication with a plurality, but not all, of the transmitter units.

Throughout the present disclosure, each transmitter unit is referred to as "TX" and each receiver unit is referred to as "RX." In some embodiments, the system comprises the same number of TXs as there are RXs. In other embodiments, there are more TXs than RXs while in other embodiments there are more RXs than TXs. In the present disclosure, there are a total number of M TXs, numbered TX1, TX2, TX3, TX4, . . . , $TX_{M-1}$, and $TX_M$, while there are a total number of N RXs, numbered RX1, RX2, RX3, RX4, . . . , $RX_{N-1}$, and $RX_N$. See, for example, FIG. 1 where each TX 102 and RX 104 are shown. Thus, for a system having 6 TXs, the transmitter units are numbered TX1, TX2, TX3, TX4, TX5, and TX6, while for a system having 6 RXs, the receiver units are numbered RX1, RX2, RX3, RX4, RX5, and RX6.

Throughout the present disclosure, capital letter "M" refers to the total number of TX units 102,202, and capital letter "N" refers to the total number of RX units 104. Small letter "m" refers to the last TX unit in the system, while small letter "n" refers to the last RX unit in the system. (See, for example, FIGS. 1 & 2)

Figure 3:
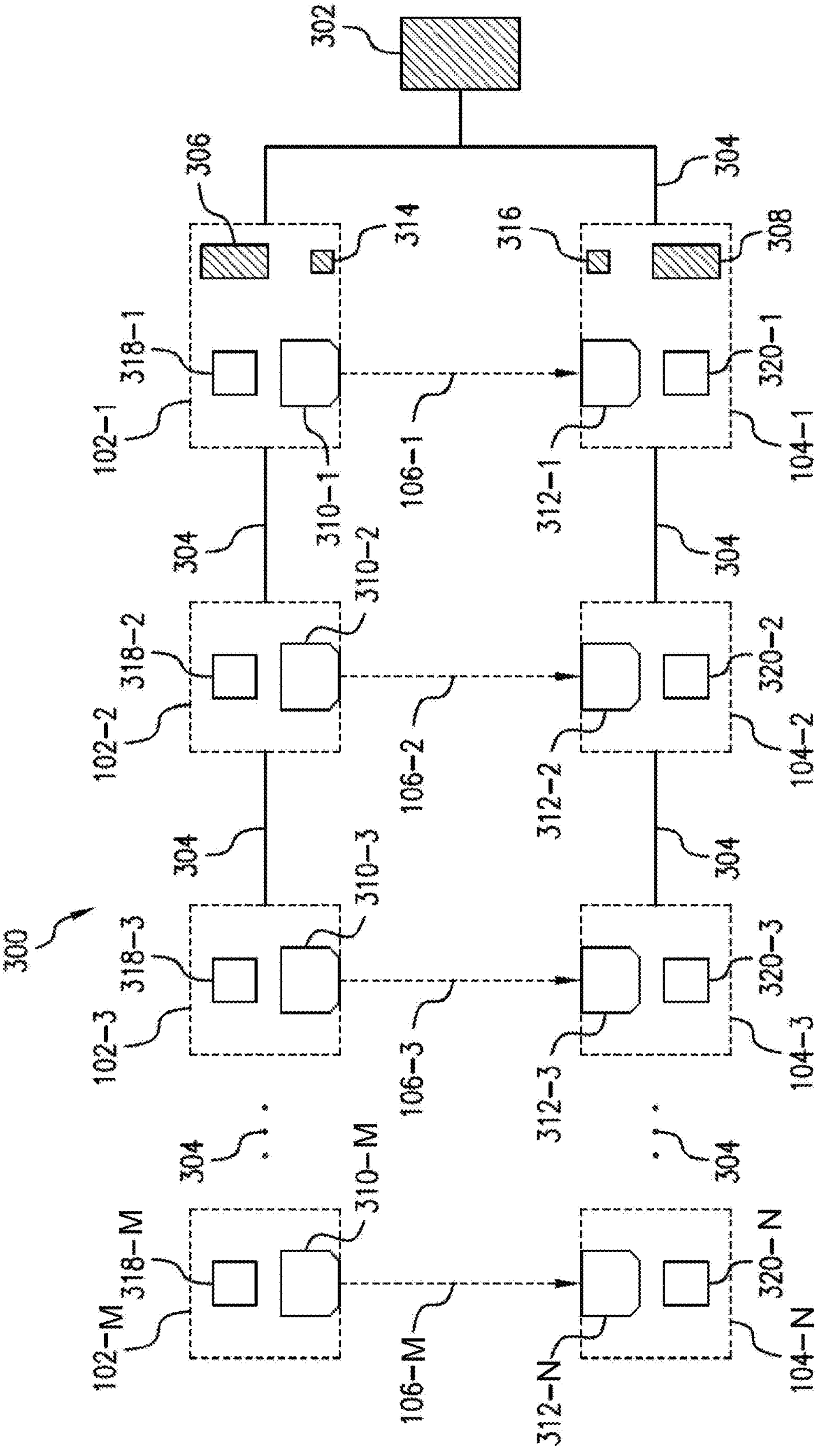
FIG. 3 is a diagram showing an embodiment of a top level block diagram 300 for the presently disclosed TX/RX arrangement.

Each of the TXs 102 and each of the RXs 104 are in electric communication with a power source 302 (FIG. 3). In some embodiments, the power source 302 is an AC-AC converter that lowers the voltage of an input alternating current (AC) and outputs the low voltage AC to the TXs 102 and/or RXs 104.

By "low voltage" in the context of the present disclosure it is meant a voltage of <10 V, or <7 V, or <5 V. Alternatively, "low voltage" provides "low power," which is measured at <1 watt (W), or <500 mW, or <200 mW.

In certain embodiments, the low voltage AC is connected to one of the TXs 102 and/or RXs 104 units and the other units are in electric communication with the unit connected to the power source 302. In some embodiments, the power source 302 is a direct current (DC) power source 302, for example a battery. In some of these embodiments, the disclosed sensor systems use a DC-DC converter to convert the DC output voltage to the input voltage used by the sensor system. In some embodiments, the power source 302 is a combination of a power source and a communication interface, for instance, the wires 304. In some of these embodiments, the power budget for the system becomes very limited.

In some embodiments, the system's main CPU is also within the power source 302. In other embodiments, the system's main CPU is a separate unit located within the system outside of the power source 302. The system's main CPU is not shown in the drawings as a separate unit.

Referring now to FIG. 1, a one-to-one configuration is shown featuring M TXs 102 and N RXs 104, where n is an integer natural number, for example 1, 2, 3, 4, 5, 6, 7, etc. An EM narrow beam 106 provides communication between a TX 102 and its corresponding RX 104. The TXs 102 are affixed on a transmitter background 108, while the receiver units are affixed on a receiver background 110. The backgrounds 108,110 can be any surface on which the units can be affixed, for example a wall, board, garage door railings, etc. The value of N and/or M, i.e., the number of TX units and RX units, respectively, in the sensor system, is dependent on the application of the sensors and the area to be covered. The longer the backgrounds 108,110 are, the more TX and or RX units are potentially needed to cover the area between the two backgrounds 108,110.

Figure 2:
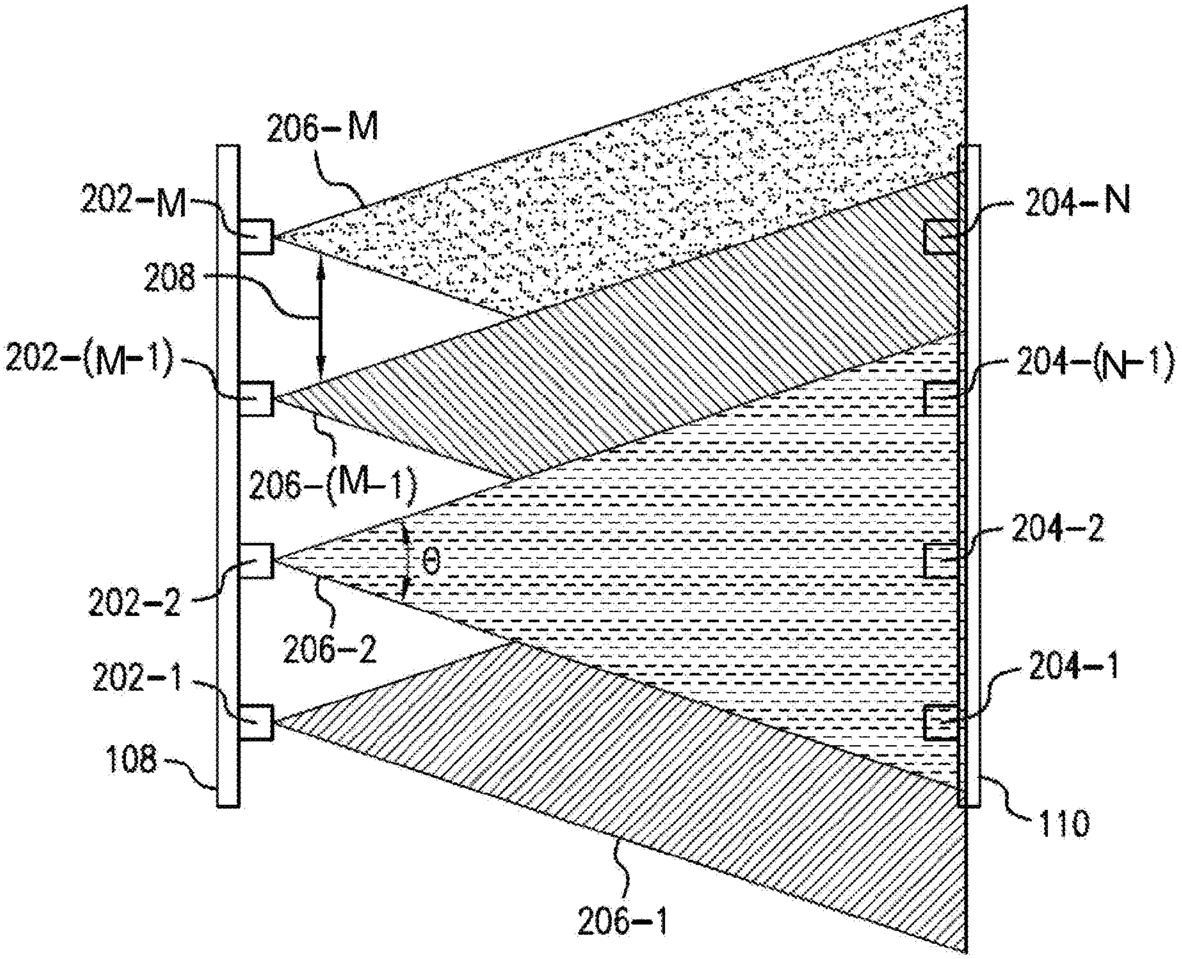
FIG. 2 is a drawing showing a plurality of one-to-many, wide beam, EM communications.

FIG. 2 illustrates an embodiment where the beam is a cone or a wedge 206 (i.e., a wide beam). As can be seen, each wide beam 206 covers more than one RX 204 unit, meaning that the code sent by each TX 202 is received and processed by more than one RX 204 unit. In some embodiments, all RX 204 units receive wide EMbeams 206. In other embodiments, such as the one illustrated in FIG. 2, less than all of the RX 204 units receive the wide beam 206. In other words, the embodiment of FIG. 2 is an example of a one-to-many configuration.

In some embodiments, the lens for the TXs 202 is used to generate wide or narrow beams, such that the coded wide beam 206 spreads in three-dimensional space towards the RX 204 units. In certain of these embodiments, the RX units 204 detect a waveform of light that is in their sight of view. In these embodiments, the RX units 204 act the same way as they do in the narrow beam embodiment, as shown in FIG. 1. In other embodiments, the RX units 204 comprise a lens that captures light coming at it from multiple different angles, such that it can detect the code sent to it.

As shown in FIG. 2, a gap 208 is created where the conic beams 206 do not overlap. While the gap 208 is shown at the TX 202 side, a similar gap 208 is also created at the opposite, RX 204, side. The RX 204 gap can be visualized by imagining the mirror image of FIG. 2. If an object were to cross the beam curtain at the point of the gap 208, then the system will not recognize the object and no "Blocked Beam" signal is generated. In some embodiments, the height of the gap 208 depends in part on the height of the backgrounds 108,110 and the number of TX 202 units in the system, i.e., the number of TX 202 units per unit length of the backgrounds 108, 110, or the "concentration" of TX 202 units. The higher the concentration of TX 202 units, the shorter the height of the gap 208 is. In some embodiments, the size of the gap 208 is determined by the distance between backgrounds 108,110. The further the two backgrounds 108, 110 are from each other, the smaller the size of gap 208. In other embodiments, the size of the gap 208 can be modulated by the arc angle θ (FIG. 2) of the emitted wide beam. The lens on the TX units 202 can be modified to change the arc angle θ. In some embodiments, the larger the angle θ, the smaller the gap 208. In some embodiments, arc angle θ is between about 20° to about 160°, while in other embodiments, the angle θ is between about 40° to about 80°. In some embodiments, the angle θ is 40°, 50°, 60°, 70°, 80°, 90°, 100°, 110°, or 120°. A user may modify the TX 202 unit concentration in an employed system, or modify the arc angle, to achieve a gap 208 that serves the needs of the specific system. In some implementation, a gap 208 of even one inch is too long, whereas in other implementation, the gap 208 may be up to twelve inches or more.

One of the biggest advantages of a one-to-many system as opposed to a one-to-one system is that the gap 208 is relatively very small. In a one-to-one system, the corresponding gap includes the entirety of the open surface to be protected (e.g., the open front of a garage, open sides of an instrument, area around a museum piece, and the like) except for a narrow line where a single beam crosses the opening surface. By contrast, the gap 208 in the one-to-many system is small (FIG. 2) and forms very near to the backgrounds 108,110, which consequently identifies an object intrusion into the opening surface.

In some embodiments, one TX 102 is designated to be a primary transmit board, or a "PTX," while one RX 104 is designated to be a primary receiver board, or a "PRX." Any board that is not a primary board is referred to simply as a board. Thus, for example. PTX 102-1 is a primary transmit board while TX 102-2 is a non-primary transmit board.

In some embodiments, the PTX is the most proximal TX 102, that is TX 102-1 and TX 202-1 in FIGS. 1 & 2, and the PRX is the most proximal RX 104, that is RX 104-1 and RX 204-1, FIGS. 1 & 2.

The terms "distal" and "proximal" with respect to the TXs and RXs refer to the proximity of the TX or RX to the power source (see below). Thus, a proximal TX is closer to the power source than a distal TX.

In certain embodiments, each PTX comprises a voltage converter, a micro-controller, an indicator LED, and an EM emitter diode. In some embodiments, the PTX comprises additional discrete components disclosed here or known to a person of ordinary skill in the art (POSITA). In some of these embodiments, each TX 102 comprises a micro-controller and an EM emitter diode. In some of these embodiments, the TX 102 also comprises an indicator LED.

Similarly, in some embodiments, each PRX comprises a voltage converter, a micro-controller, an indicator LED, and an EM photo-detector module. In some embodiments, the PRX comprises additional discrete components disclosed here or known to the POSITA. In some of these embodiments, each RX 104 comprises a micro-controller and an EM photo-detector module. In some of these embodiments, the RX 104 also comprises an indicator LED.

In certain embodiments, the voltage converter is a separate board that is connected in series with the TXs 102 and/or RXs 104 and is not necessarily a component part of a single board. In certain other embodiments, the voltage converter is located elsewhere and not in physical proximity to the TRX/PRX. For example, in the case of a garage door sensor, the voltage converter may be located in the garage door opener box attached to the garage ceiling and be in electronic communication with the TRX/PRX located on the garage door railing.

In some embodiments, each TX 102-*m*, where m is an integer, is in electronic communication with at least two other TXs, TX 102-($m$−1) and TX 102-($m$+1). The two exceptions to this are 1) the PTX, i.e., TX 102-1, which is in communication with TX 102-2 and with the power source 302, and most distal TX, i.e., TX 102-*m*, which is only in electronic communication with the penultimate TX, i.e., TX 102-($m$−1). In some embodiments, the TXs 102 are arranged in series while in other embodiments they are arranged in parallel.

In some embodiments, each RX 104-*n*, where n is an integer, is in electronic communication with at least two other RXs, RX 104-($n$−1) and RX 104-($n$+1). The two exceptions to this are 1) the PRX, i.e., RX 104-1, which is in communication with RX 104-2 and with the power source 302, and most distal RX, i.e., RX 104-*n*, which is only in electronic communication with the penultimate RX, i.e., RX 104-($n$−1). In some embodiments, the RXs 104 are arranged in series while in other embodiments they are arranged in parallel.

Referring now to FIG. 3, an embodiment of a top level block diagram 300 for the presently disclosed TX/RX arrangement. A power source 302 provides power to the entire system. In some embodiments, the power source 302 has one or more backup power generators so that in case the electricity to the unit is shut off, the power source 302 can generate power on its own and continue with the operation of the presently disclosed system. In certain embodiments, the backup power generator is an AC generator, or a DC generator, such as a battery. The power source 302 is in electrical communication with the plurality of TXs and RXs in the system through wires 304.

In some embodiments, during the operation of the system PTX 102-1 receives power from the power source 302 through the wires 304. In the embodiment shown in FIG. 3, the wire 304 connecting to the ultimate $TX_m$ 102-*m* is shown as a dotted line indicating that there may be other TXs in the line between TX3 102-3 and $TX_m$ 102-*m*.

In some embodiments, the power sent by the power source 302 is low voltage for use by the system's units. In other embodiments, the power source 302 provides power at the regular main line voltage—for example, 110 V or 220 V, depending on the jurisdiction. In embodiments when main line high voltage is used, a voltage converter is used to generate low voltage for use by the system's units. Depending on the type of power generated by the power source 302, the converter is either a DC-DC or AC-AC or AC-DC or DC-AC converter.

Voltage converters 306,308 are provided. In some embodiments, the voltage converter discussed above is a part of a voltage converter 306,308. In some embodiments, a single voltage converter 306 is used to provide power to the system as a whole. In other embodiments, for example the one shown in FIG. 3, a voltage converter 306 is provided for the all the TX 102 units. In further embodiments, another a separate voltage converter 308 is provided for the all the RX 104 units.

In some embodiments, voltage converter 306 generates transmit timing signals (see below) for all TX boards in the chain. Voltage converter 306 also transmits identification sequence for the next TX (e.g., TX2 102-2) in the chain.

In another aspect, the present disclosure is directed to methods of identifying the passage of an object through a spatial surface. A "spatial surface" in the context of the present disclosure is a surface bound on one side by transmitter background 108 and on the other side by receiver background 110. When an object crosses the spatial surface, i.e., passes through the spatial surface, the present methods recognize the passage and send a "Blocked Beam" signal to the main CPU.

In one embodiment of the operation of the present system, TX microcontroller 318 generates the code for the first EM beam 106-1, and sends the code to the EM Transmit LED 310-1, which then generates the coded EM beam 106-1 and transmits it to the corresponding EM receiver 312-1 located on the PRX 104-1. The RX microcontroller 320 in PRX 104-1 then analyzes the waveform and its code. If it finds the beam to be unblocked, then it either sends a "No Blocked Beam" signal to the main CPU or sends no signal at all. In some embodiments, the lack of a signal indicates there exists no problem with the system. In certain embodiments, a light emitting diode (LED) 314 (Transmitter User Indicator LED) on the PTX 102-1 unit provides a visual signal, for example by staying continuously on, or shine a green light, to indicate the system is working properly, or blink rapidly, or shine a red light, when there is an issue with the system. In some embodiments, a corresponding Receiver User Indicator LED 316 on the PRX 104-1 unit provides a visual signal regarding the proper operation of the RXs.

While the embodiment shown in FIG. 3 depicts a one-to-one EM communication, a POSITA understands that the same process can be used with the one-to-many and one-to-all communications. In the latter two systems, the EM Transmit LED 310-1 and the EM receiver 312-1 send and receive, respectively, multiple coded messages, as discussed above.

Once the EM Transmit LED 310-1 has sent the EM beam 106-1, the next TX board in line, e.g., TX2 102-2 receives a coded transmit identification sequence (TIS). In some embodiments, the coded TIS is sent by the TX microcontroller 318, while in other embodiments, the coded TIS is sent by the TX immediately prior to the TX in question. For instance, if it is the turn of TX3 102-3, then the coded TIS is sent either by the voltage converter 306 or by TX2 102-2. Both of these scenarios are within the scope of the present disclosure.

The EM Transmit LED 310-2 now sends the second EM beam 106-2 to the corresponding RX2 104-2. Then the process repeats itself for the next TX board in line, e.g., TX3 102-3, and on down the line until a code is sent to the ultimate TX board, i.e., $TX_m$ 102-*m*.

It is to be noted that the designation TX2, TX3, etc., does not refer to the physical location of the TX boards, that is it may not be the case that TX3 is the board that is physically immediately after TX2 in the system. Instead, these designations are based on the coded TIS that is sent to the TX boards. Thus, while PTX may be the first board in the sequence, TX2 may physically be the last TX board in line, but it is the second TX board that sends a signal. Thus, the designation of TX2, TX3, etc., refers to the position of the TX board in the sequence of sending coded TISs.

In some embodiments, a micro-controller 318 is responsible for interpreting the coded TIS and send the coded signal 106 to the receiver RX 104 unit. In some embodiments, such as that shown in FIG. 3, there is a separate micro-controller 318 in each of the transmitter TX 102 units, while in other embodiments, a single micro-controller 318 handles the processes for the entire system.

Similarly, in some embodiments, a micro-controller 320 is responsible for interpreting the coded signal 106 received by the receiver RX 104 unit. In some embodiments, such as that shown in FIG. 3, there is a separate microprocessor 318 in each of the transmitter RX 104 units, while in other embodiments, a single micro-controller 320 handles the processes for the entire system.

During the use of the presently disclosed systems in some embodiments, two types of code are generated and used. The first type of code is termed herewith coded "transmit identification sequence" or TIS for short. The purpose of the coded TIS is to designate which TX board is next in line for transmitting an EM beam and also provide the waveform for that particular EM beam. Whatever TX unit receives the second coded TIS is TX2 and will send a waveform 106 to its corresponding receiver(s). Likewise, whatever TX unit receives the third coded TIS is TX3 and will send an EM beam 106 to its corresponding receiver(s). And on down the line.

In some embodiments, the coded TIS for PTX 102-1 is fixed as this is the first code that starts the process. In other embodiments, the coded TIS is selected from a list of pre-programmed coded TISs in the system and at the start of each use, one of the pre-programmed codes is randomly assigned to PTX 102-1. However, the coded TIS for the subsequent TXs 102-1 to 102-*m* is uniquely generated. In some embodiments, the coded TISs are generated randomly while in other embodiments, the coded TISs are selected from a pre-programmed library of coded TISs.

The second type of code is a pulse distance code (PDC), which is the code generated for the EM beam 106. The EM beam 106 is not a binary waveform, that is it contains more information than just determining whether the beam is present or absent. Instead, the PDC for each beam 106 is coded with 1s and 0s so that each beam 106 used in the system is unique and individually identifiable.

The following discussion provides an overview of one embodiment of the operation of the systems disclosed herein.

Each transmitter unit TX 102 obtains and identification code, i.e., the coded transmission identification sequence (TIS). The coded TIS for PTX 102-1 is preset or is obtained from a pre-programmed list of coded TISs. By reading the preset or pre-programmed coded TIS, PTX 102-1 identifies itself as the PTX and the first TX to transmit an EM beam 106.

PTX 102-1 then obtains a code, either generated within the micro-controller 318-1 of PTX 102-1 or sent along the coded TIS. The EM Transmit LED 310-1 of PTX 102-1 then transmits a coded EM beam 106-1, which is received by one, several, or all of the receiver units RXs 104.

The system then sends a second coded TIS to another transmitter unit TX 102. The subject transmitter unit TX 102 then identifies itself as the second transmitter unit 102 in the series, i.e., TX2 102-2. The transmitter unit TX2 102-2 then transmits a coded EM beam 106-2, which is received by one, several, or all of the receiver units RXs 104. This process is then repeated for all the remaining TXs.

In some embodiments, the coded TISs for TX2 102-2 through $TX_m$ 102-*m* is sent to all the TXs on power up, while in other embodiments, the coded TISs are sent each time a transmission occurs.

Accordingly, in some embodiments, the identification of each transmitter unit TX 102 in the chain of transmissions is performed by sending a coded TIS to the next TX in the chain. By way of example, PTX 102-1 starts the ping cycle once per second, or a shorter interval, such as once per millisecond, or once per microsecond, by transmitting its EM beam 106-1, followed by sending a coded TIS to TX2 102-2. When TX2 102-2 receives the coded TIS from PTX 102-1, TX2 102-2 transmits its EM beam 106-2, followed by sending a coded TIS to TX3 102-3, and so on.

In some embodiments, the identification frame serves as a synchronization frame since the EM beam 106 is sent after receiving the coded TIS.

The EM beams 106 are coded in a binary system. In some embodiments, the code comprises at least four digits, while in other embodiments, the code comprises at least eight digits. Any number of digits, preferably greater than two, for example, 3, 4, 5, 6, 7, 8, 9, or 10, can be used to code the EM beams 106.

In some embodiments, the code is a waveform, such as a gated carrier wave. The word "code" throughout the present disclosure is used in conjunction with the gated carrier wave and other waveforms.

In other embodiments, the code is a binary code, which corresponds to the position in the chain for the TX. By way of example only, in a five digit code format, PTX would have the code [0 0 0 0 1], which is the number one in a binary system. TX2 would have the code [0 0 0 1 0], TX5 would have the code [0 0 1 0 1], TX10 would have the code [0 1 0 1 0], TX15 would have the code [0 1 1 1 1], TX20 would have the code [1 0 1 0 0], TX25 would have the code [1 1 0 0 1], and so on, until one obtains [1 1 1 1 1], which is 31. Note that [0 0 0 0 0] is not used as it would denote no transmission. Thus, when a five digit code format is used, a maximum of 31 TXs can be used. If a higher or lower number of TXs is desired, then a coding system having a greater or fewer, respectively, number of digits is used.

In some embodiments, the code is repeated two, three, or more times to maintain code integrity. For example, PTX can have the code, [0 0 0 0 1] (unrepeated), [0 0 0 0 1 0 0 0 0 1] (twice repeated), [0 0 0 0 1 0 0 0 0 1 0 0 0 0 1] (thrice repeated), and the like.

In a one-to-one system, for example that shown in FIG. 1, each receiver unit RX 104 receives the code of the EM beam 106 aimed at it. In some embodiments, the receiver units RX 104 are programmed with a preset receive time, RT. In some embodiments, RT is one second, or a shorter interval, such as one millisecond or one microsecond, or some such similar time interval. The RX waits for the duration of RT to receive the transmitted coded EM beam 106. If the EM beam 106 is detected within the RT, then the RX sends a "No Blocked Beam" signal to the main CPU or sends no signal at all. If the EM beam 106 is not detected within the RT, then the RX sends a "Blocked Beam" signal to the main CPU, at which time the main CPU takes the pre-programmed action, such as sending an alarm, stopping a process, and the like.

In a one-to-all system, for example that shown in FIG. 2, each receiver unit RX 104 receives the code of the EM beam 106 for all the TXs. Again, if a EM beam 106 is not received by an RX 104 during the pre-designated RT, then the system registers the blocked line and sends a "Blocked Beam" signal to the main CPU.

Figure 4:
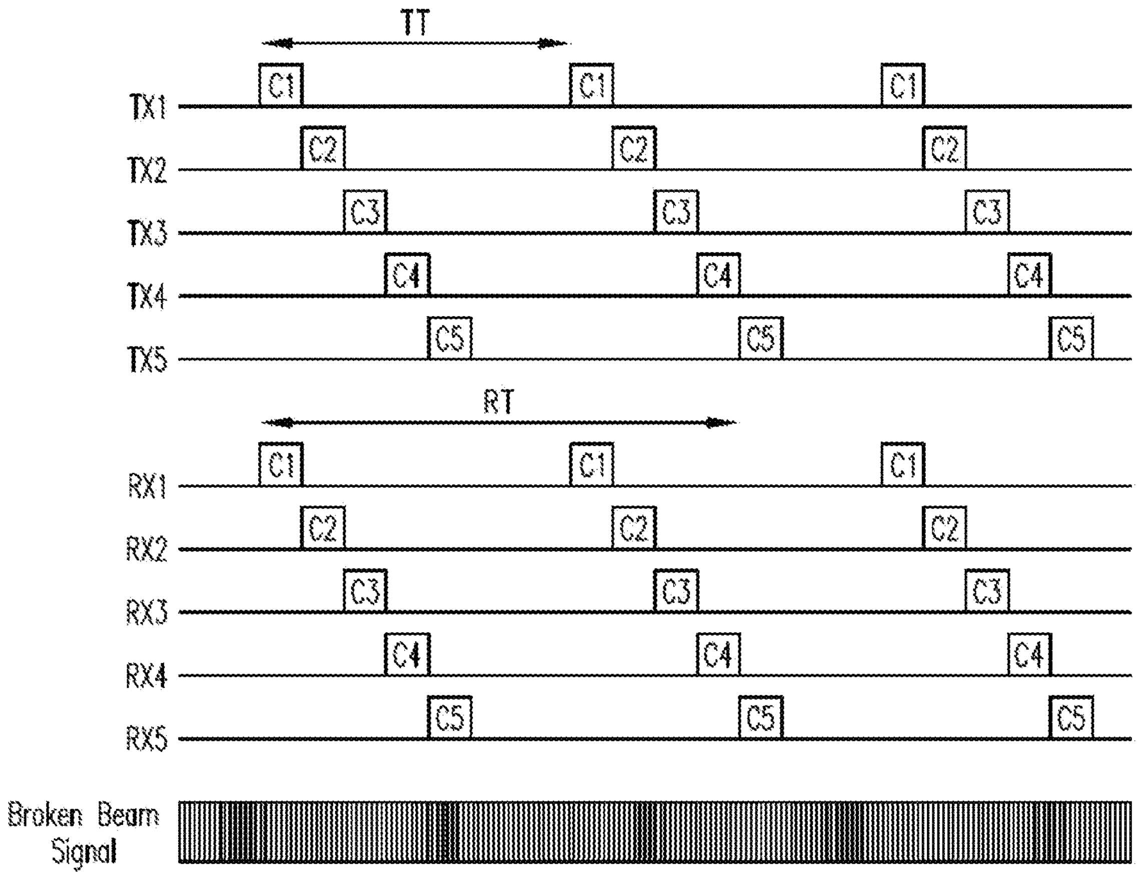
FIG. 4 is a diagram showing an embodiment of a timing diagram for a "No Blocked Beam" situation in a one-to-one system.

FIG. 4 shows an embodiment of a timing diagram for a "No Blocked Beam" situation in a one-to-one system, an embodiment of which system is shown in FIG. 1. The embodiment shown in FIG. 4 comprises five TX 102 units, TX1-TX5. Each TX transmits a coded EM beam, in the figure designated as C1-C5. The time "TT" is the transmit time, or cycle time, which is the time from the start of the transmit of C1 until the next time C1 is transmitted again. In some embodiments, TT is the same from the start of the transmit of any of the Cs until that same C is transmitted again. In other embodiments, while the time from C1 to C1 is TT, within that, other TXs transmit at random times such that, for example, the start of one C2 transmission to the start of the next C2 transmission is not TT.

In some embodiments, in order to save power, not all TX units 102,202 transmit simultaneously. In some of these embodiments, the length of cycle time $T_T$ is divided into segments. During each segment one of the TXs 102,202 transmits. For example, if there are 5 TXs 102,202, and each $T_T$ is one second, then each TX 102,202 transmits for less than ⅕ of a second, i.e., <200 m sec, to allow for a gap in between transmissions. However, the transmit side and the receiver side of the system do not have the same reference clock. Thus, there may be a delay, according to the receiver side reference clock, for a transmitted waveform to be detected. For this reason, in some embodiments, for example that shown in FIG. 4, the time "$R_T$," the receive time, is longer than $T_T$ to allow for all transmissions to be received.

As is seen in FIG. 4, all the coded EM waveforms C1-C5 that are transmitted by the TXs are received by the corresponding RX. No blocked beam is detected as the "BLOCKED BEAM" line is flat and there is no gap in the signal sent to the base station, as the "Signal to Base Station" line is unblocked.

Figure 5:
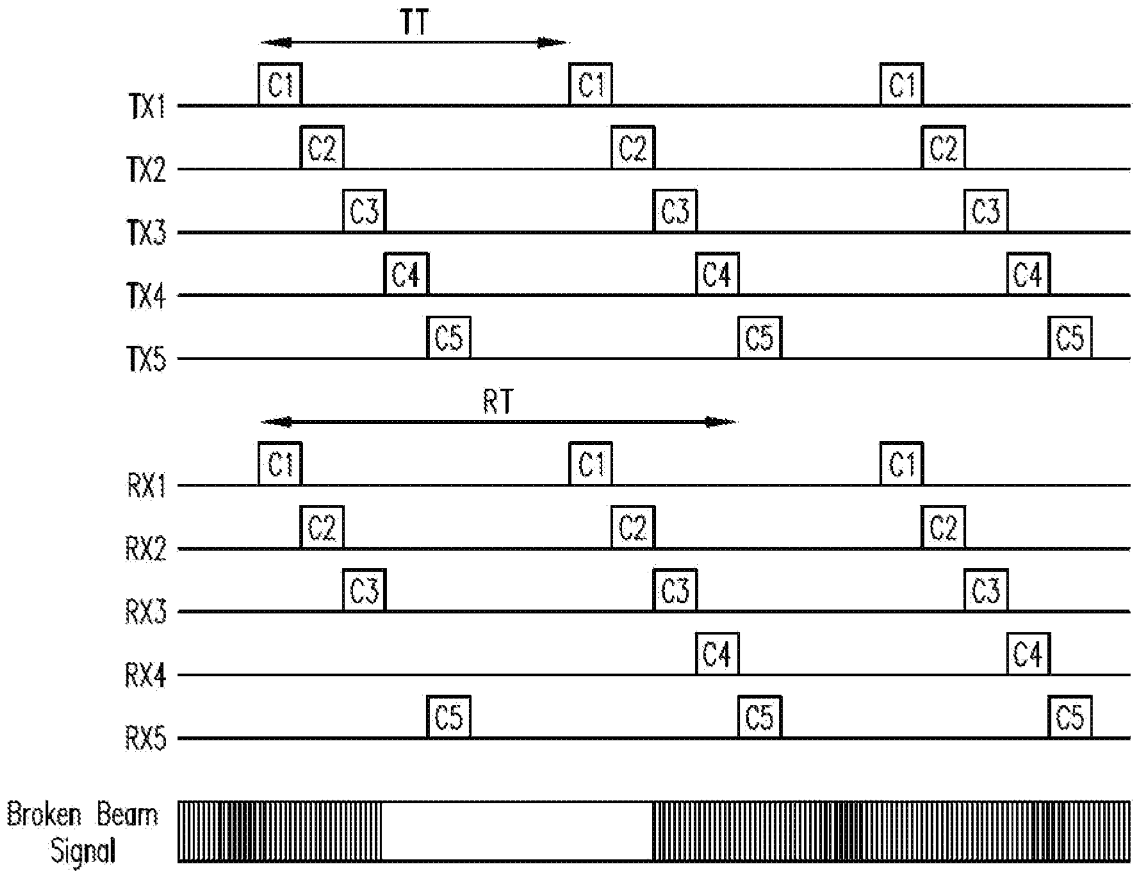
FIG. 5 is a diagram showing an embodiment of a timing diagram for a "Blocked Beam" situation in a one-to-one system.

By contrast, FIG. 5 shows an embodiment of a timing diagram for a "Blocked Beam" situation in a one-to-one system. As can be seen, during the first cycle, RX4 does not receive the C4 waveform, but the waveform is received during the other cycles. This indicates that the C4 waveform was temporarily interrupted. At next sensing time with period $T_R$, the beam is blocked, a signal is detected in the "BLOCKED BEAM" line and there is a gap in the "Signal to Base Station" line. The main CPU at the base station now begins the pre-programmed protocol for a Blocked Beam signal.

Figure 6:
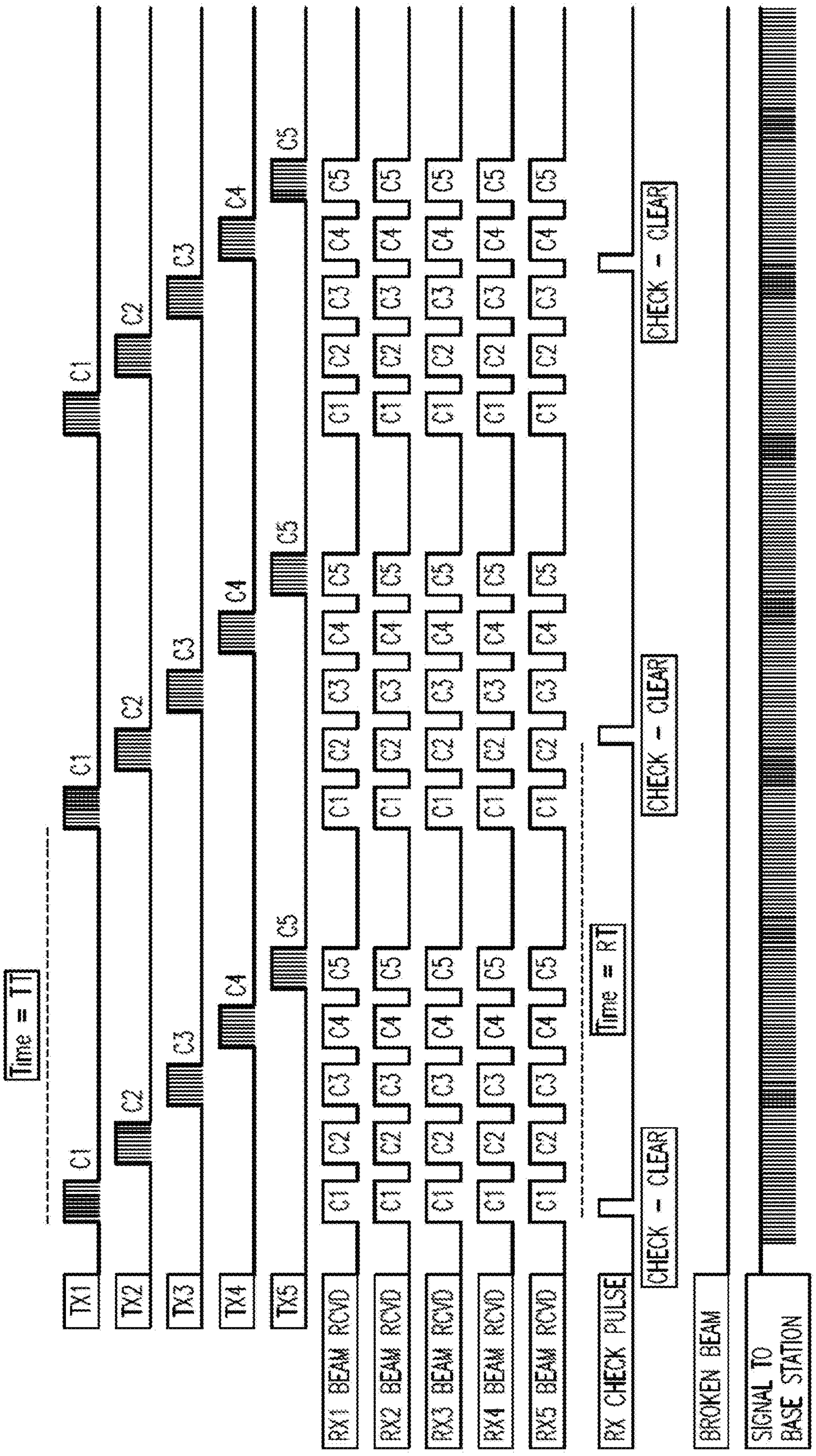
FIG. 6 is a diagram showing an embodiment of a timing diagram for a "No Blocked Beam" situation in a one-to-all system.

FIG. 6 shows an embodiment of a timing diagram for a "No Blocked Beam" situation in a one-to-all system, an embodiment of which system is shown in FIG. 2. The transmit part of the figure, i.e., the top portion showing the TXs transmitting the coded C waveforms, is the same as what was shown in FIG. 4. But contrary to the one-to-one situation, in the receive part of the figure, i.e., where the RX waveforms are shown as received, each RX, i.e., RX1-RX5, receives all the coded signals C1-C5. In the embodiment of FIG. 6, because every transmitted signal is received, the "BLOCKED BEAM" line is flat and there is no gap in the signal sent to the base station, as the "Signal to Base Station" line is unblocked.

Figure 7A:
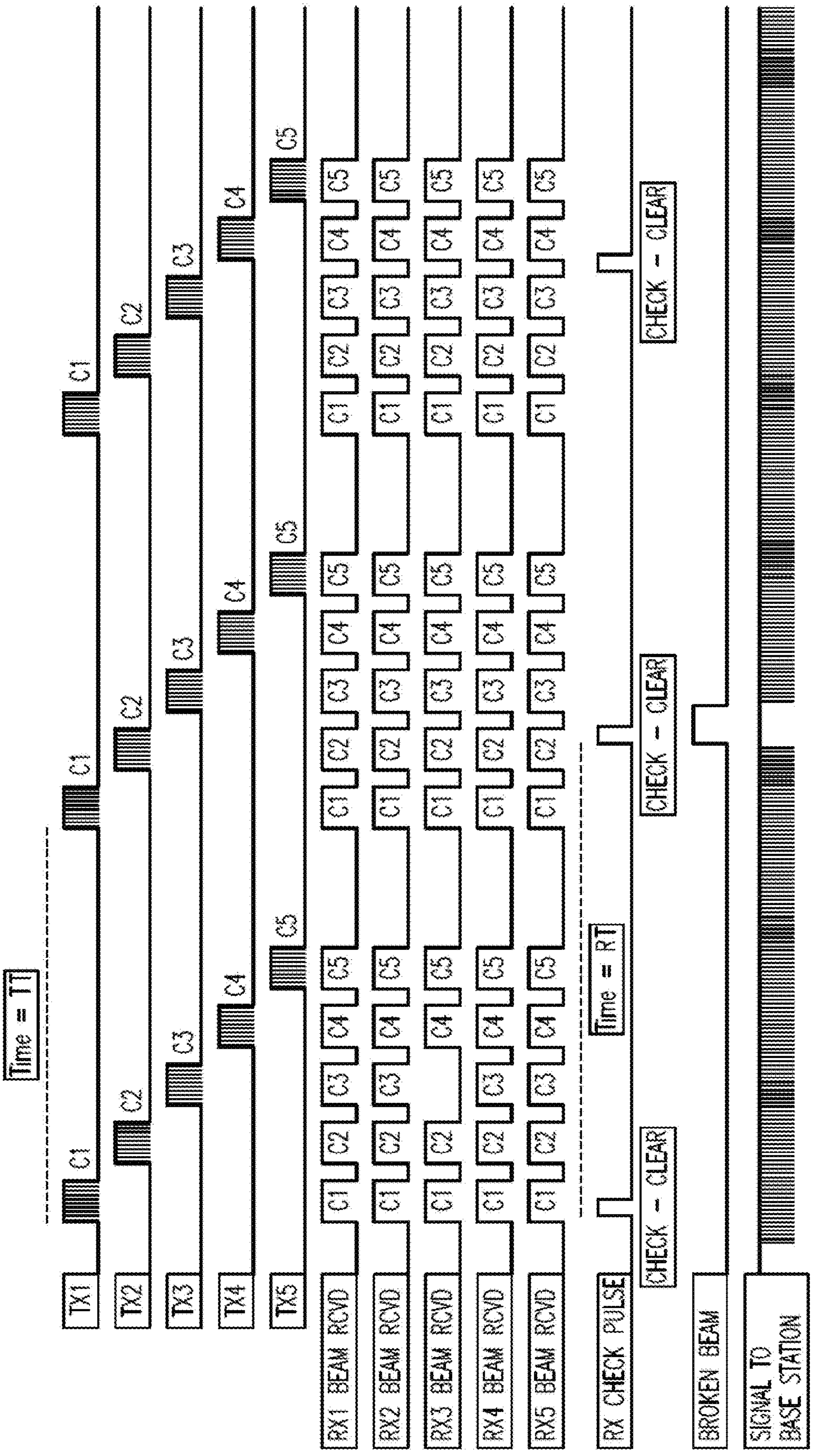
FIG. 7A is a diagram showing an embodiment of a timing diagram for a "Blocked Beam" situation in a one-to-all system.

By contrast, FIG. 7A shows the timing diagram for when one of the beams is blocked. As can be seen from the figure, RX3 does not receive C3 from TX3 in the first cycle. At the conclusion of RT, as no C3 signal has been received, the beam is deemed blocked, and a signal is detected in the "BLOCKED BEAM" line and there is a gap in the "Signal to Base Station" line. The main CPU at the base station now begins the pre-programmed protocol for a Blocked Beam signal. The embodiment shown in FIG. 7A is one in which the system waits for all RX 202 units to receive all the TX 202 signals 206 before the system can determine if the signal is blocked. For this reason, and as contrasted to the embodiment of FIG. 5, the Blocked Beam signal is not immediately generated when a waveform is undetected. The signal is generated when RT is completed, and the system determines one of the signals is not received.

In some embodiments, bright ambient light, e.g., sunlight, floodlight, interferes with the function of the system. Certain pulse-distance coding waveforms are susceptible to interference from bright sunlight. The interference can either transition the EM receiver module (RX 204) output from high to low when no transmitter (TX 202) is active or from low to high when a transmitter is active.

In some embodiments, the bright light interference when transmitter (TX 202) is on is negligible compared to when it is off. Therefore, it is sufficient to only model the interference when the transmitter (TX 202) is off. The interference is modelled as a Poisson process with parameter $$\lambda = \frac{\rho}{E[T]}$$

where

ρ (rho) is the noise density;

T is the mean interference duration;

E is the expectation operator;

E[T] is the mean of the interference duration; and

Mean value of interarrival time is $1/\lambda$ and it is exponentially distributed.

Figure 7B:
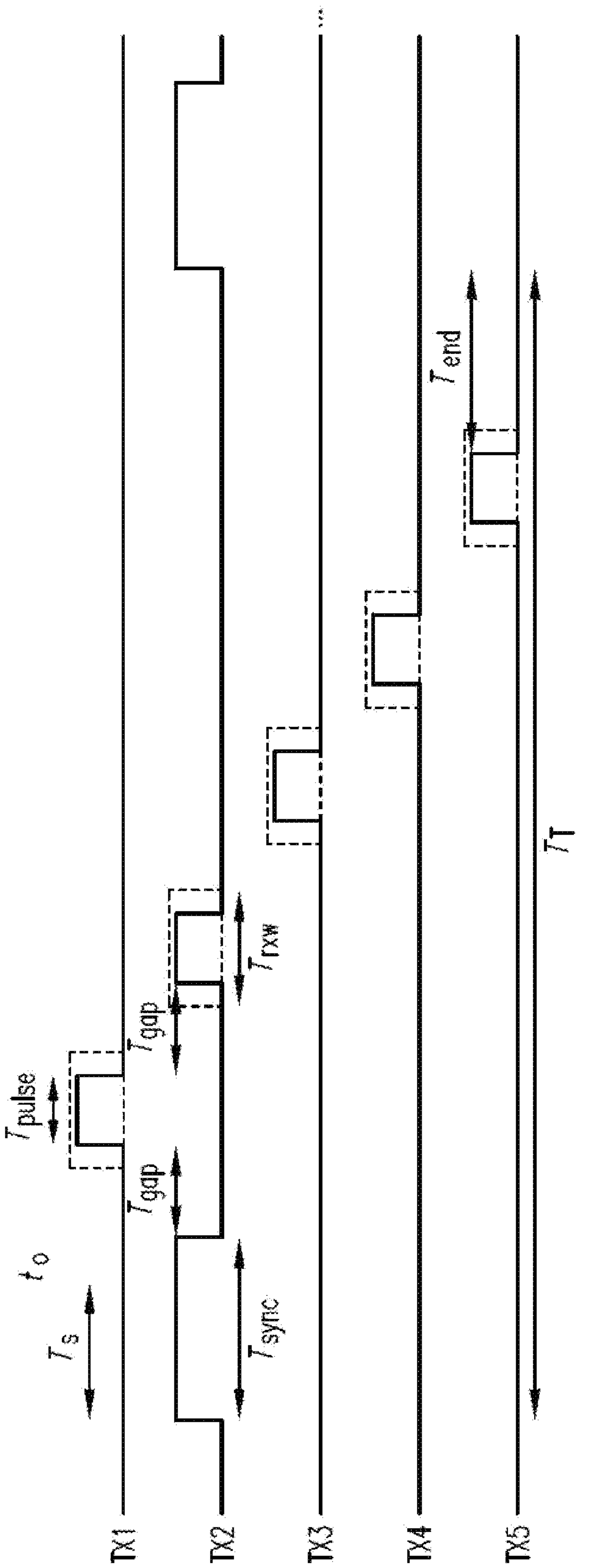
FIG. 7B is a diagram showing an embodiment of a timing diagram to mitigate bright light interference in a one-to-all system.

In one embodiment, a scheme relying on density detection is shown in FIG. 7B. Synchronization and detection utilizing density would help filter out interference due to bright sunlight. Time durations in the diagram are in units of ms and is a simultaneous optimization for the following parameters:

Fast response time (minimize duration of full transmit cycle)

Robust acquisition (long synchronization pulse and sufficient difference in duration between synchronization pulse and channel pulses)

Low false detection rate of blocked beam condition (long channel pulses and low channel-detect density threshold)

Low missed detection rate of blocked beam condition (long channel pulses and high channel-detect density threshold)

In some embodiments, the transmit cycle does not utilize any coding, i.e., pulses in waveform diagram correspond to when the carrier is on for a particular channel. One transmission cycle starts with a synchronization pulse of duration $T_{sync}$ followed by a gap of duration $T_{gap}$. Each channel then transmits for duration $T_{pulse}$. At the end of the transmit cycle there is a gap of duration $T_{end}$. Other variables in FIG. 7B are defined as follows:

$t_0$ is the mean time at which synchronization occurs.

$\tau_s$ is the synchronization threshold.

$T_{rxw}$ is the duration of the detection window.

$T_T$ is the period of full transmit cycle including transmissions from M transmitters The systems described above are configured to be used in many varied applications, all of which depend on an object crossing a plane, thereby generating a signal.

In one application, the presently described systems are used with a garage door opener. In these embodiments, the power source 302 and the main CPU, which is also the "base station," is the garage door opener motor assembly connected to the garage ceiling. In some of these embodiments, the transmitter background 108 and the receiver background 110 are the rails that guide the garage door on its way down and up. In other embodiments, the backgrounds 108,110 are separate boards or the wall of the garage.

In these applications, when an object crosses the surface defined by the EM beams 106 and a "Blocked Beam" signal is sent back to the main CPU, the garage door motor ceases functioning, and the garage door stops moving.

The systems described herein are significantly more advantageous than the currently used systems for garage door sensors. Current sensors comprise only one transmitter and one receiver, both located within 6 inches to a foot from the floor of the garage. While these systems are useful in detecting a wheel of a car, or an object, sitting within the path of the single beam, they cannot detect other situations where the blocking object is below or above the beam. For instance, if a minivan is close to the garage door railing, an open hatch door would be under the garage door but the wheel would be inside the garage. In this example, the system does not recognize the hatch door, the garage door continues to close, causing extensive damage to the car.

Using the presently described system, the latch door of the back of the minivan causes a "Blocked Beam" signal to be sent to the main CPU, which then causes the garage door to stop, preventing the aforesaid damage. Similarly, if an object such as a bicycle is placed leaning against the garage door railing, the currently used systems would not detect the bicycle as the single beam goes through the empty space in between the two wheels of the bicycle. By contrast, the presently described systems recognize the frame of the bicycle as breaking one or more of the plurality of the beams 106, which causes the garage door to stop.

In another application, the present systems can be used in the security systems used in museums, bank vaults, and other such places where precious items are kept. As those familiar with heist movies, such as Ocean's Eleven or the Pink Panther, can imagine, the presently used systems use multiple single beam Laser transmitters to create a curtain of protection. These systems are relatively easily overcome to create holes in the protective curtain, or the use of dust to identify holes in protective curtain, where the protective curtain can be pierced without sounding an alarm.

As discussed above, it is significantly more difficult to bypass the EM beams 106 of the present systems because the code of the beam would invariably become corrupted. Also, it is more difficult to bypass one EM beam 106 in the presently described system as there is redundancy in the system and in the detected waveforms. In either case, a "Blocked Beam" signal is generated. Furthermore, by using the proper number of TX and RX units in the system, gaps in the curtain can be reduced in size significantly such that it becomes prohibitively difficult to pierce the curtain.

In some of these embodiments, the main CPU and the power source 302 are located elsewhere, for example in the main security office of the establishment. The location of the main CPU away from the protected site makes it more difficult for robbers to hack into the main CPU or physically disable it, as the main CPU is not easily reached.

In other applications, the presently described systems are used as protective covering for machines with moveable parts. In many applications, workers work around machines that contain moveable parts, such that if a limb accidentally goes into the area of moveable parts, injury to life or limb can ensue. Currently, these moveable parts are placed inside an enclosed part within a machine, which part comprises an opening covered with a door for access. Placing moveable parts inside and enclosed area significantly increases the local temperature within the enclosed area due to friction generated by the moveable parts. To combat the heat, these units have cooling fans or other cooling mechanisms. Further, there are times when the operation of the moveable parts needs to be witnessed by human operators constantly to ensure proper function. During these times, when the door to the enclosed are is open, the workspace becomes dangerous to the operators.

By placing sensors as described herewith around the location of the moveable parts, these parts can be used outside of an enclosed area. If a limb crosses the curtain generated by the presently described system, the machine, and therefore its moveable parts, stop functioning, thereby reducing or eliminating the chance of injury to the operators. While protecting the operators, the systems allow for an open use of the machine, which greatly increases heat transfer to the ambient, thereby reducing the opportunity for reaching high temperatures within the area of the moveable parts.

Figure 8:
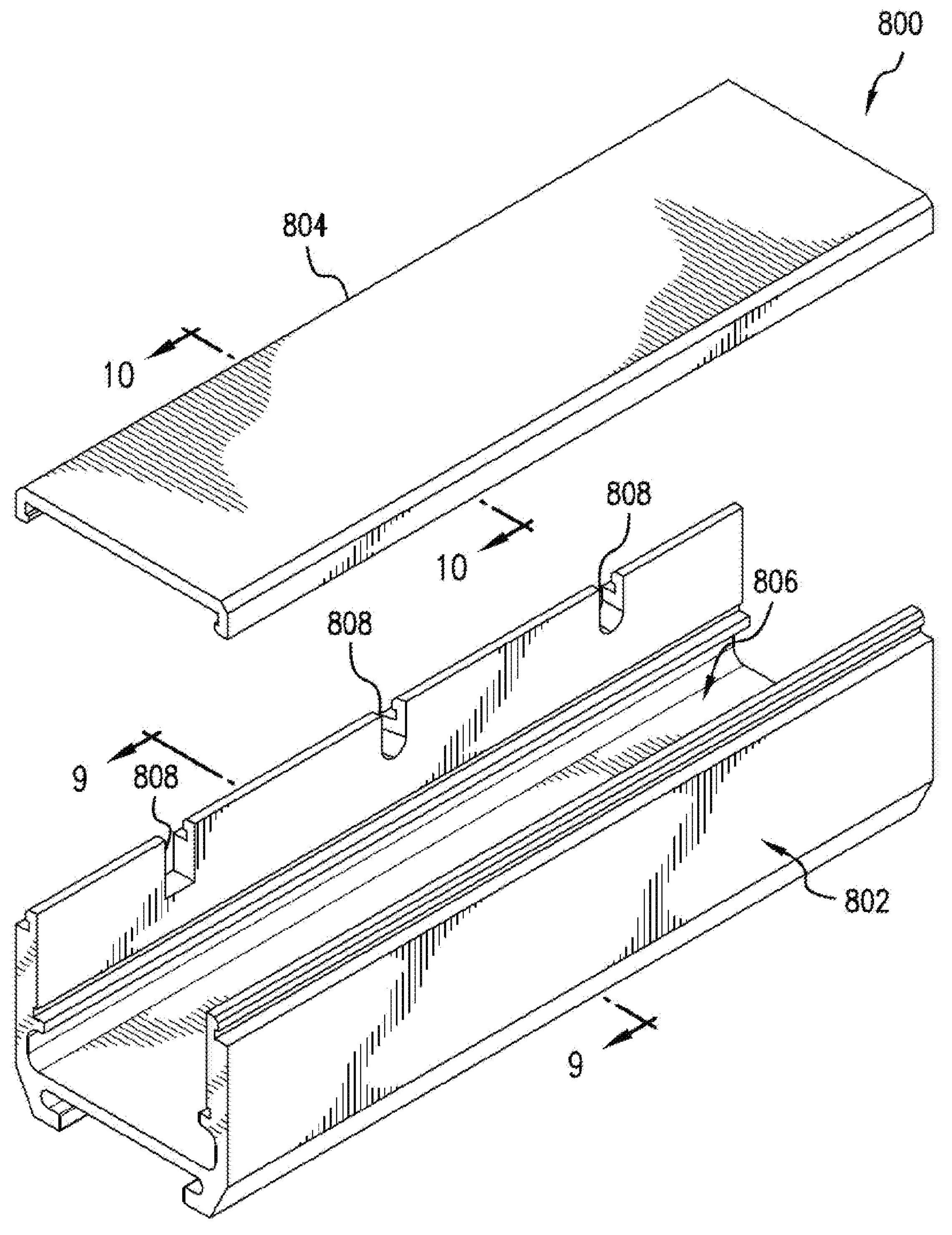
FIG. 8 is a drawing of the housing unit, as described herein, showing both the body and the lid.

FIG. 8 et seq. depict an embodiment of a housing unit 800 to house any one of the TX or RX units as disclosed herein. In the particular embodiment shown in these figures, the housing unit 800 is configured to fit on garage door railings. Therefore, the housing unit 800 is suitable for the embodiments where the systems disclosed herein are used as garage door sensors.

The housing unit 800 comprises a body 802 and a lid 804. During the operation of the systems disclosed herein and depicted, for example, in FIG. 3, a circuit board is embedded within the hollow interior 806 of the body 802. A plurality of openings 808 provide ingress or egress points for the beams disclosed herein or wires needed for the operation of the device, or for any other use where access to the interior 806 of the body 802 is desired. The lid 804 covers the body 802 to protect the interior 806 and its contents from the environment.

Figure 9:
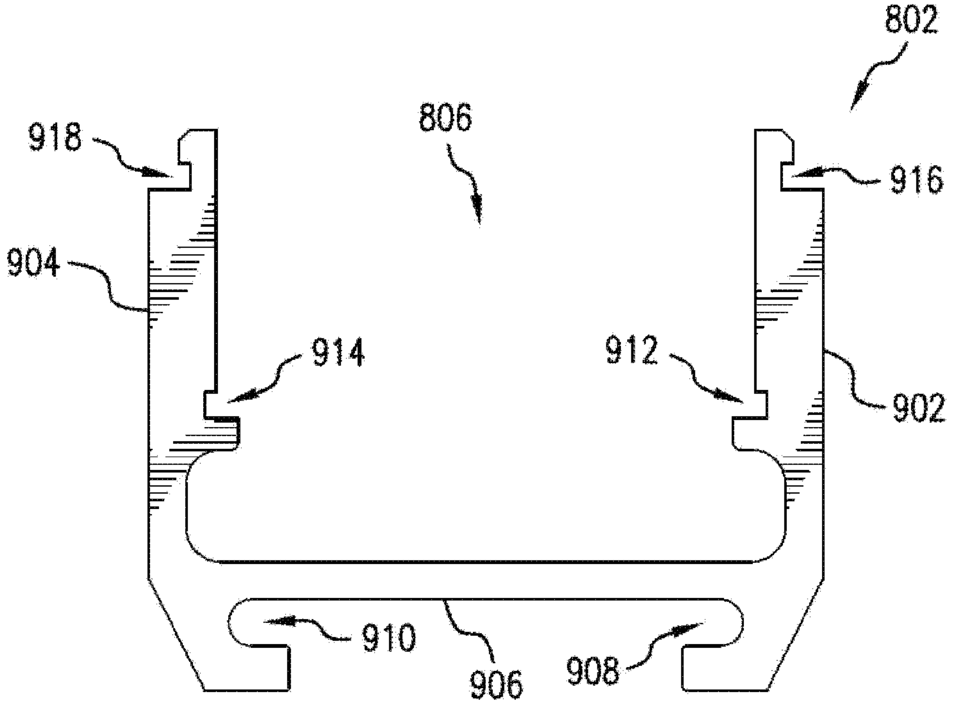
FIG. 9 shows the cross section of the body of the housing unit.

FIG. 9 shows a cross section, along the 9-9 line of FIG. 8, of the embodiment of the body 802 shown in FIG. 8. The body 802 comprises walls 902,904 on either side of the body 802 and a floor 906. For the following discussion, it is assumed that the body 802 sits as shown in FIG. 9, with the floor 906 being "horizontal," and the walls 902,904 "vertical." The hollow interior 806 is open at the "top," which is "above" the floor 906, and is bound by the floor 906 at the "bottom," which is "below" the top. Wall 902 is on the "right" and wall 904 is on the "left." A feature close to the floor 906 is "proximal" to a feature close to the top. Likewise, a feature close to the top is "distal" to a feature close to the floor 906.

As shown in FIG. 9, a groove 908,910 is provided below the floor 906 on both the left and the right sides. These grooves 908,910 are formed when the walls 902,904 curve inward at the bottom and below the floor 906, creating the groove space. The grooves 908,910 face inward, i.e., groove 908 faces left while groove 910 faces right. In some embodiments, lips on a garage door railing fit within the grooves 908,910. Thus, the body 802 is configured to snap onto a garage door railing by placing the railing lips inside the grooves 908,910.

In some embodiments, further distal to the floor 906 another set of grooves 912,914 are provided on the interior 806 side of the body 802. The grooves 912,914 face inward, i.e., groove 912 faces left while groove 914 faces right. When placing a circuit board in the housing 800, the sides along the length of the circuit board are placed inside the grooves 912,914 and the circuit board is then slid into the housing 800. In some embodiments, the width of the circuit board is less than about 5% or within about 5% to about 10% of the length from the right wall of groove 912 to the left wall of groove 914.

In some embodiments, after the circuit board is placed inside the body 802 and the lid 804 is placed over the body 802, the circuit board divides the hollow interior 806 into two parts, both hollow. One part is between the circuit board and the lid 804 (or the top of the body 802) and the other is between the circuit board and floor 906. In some embodiments, these empty areas provide air flow to both sides of the circuit board to cool its electrical components.

Another set of grooves 916,918 is provided at the top of the walls 902,904, i.e., the most distal point of the body 802. Unlike grooves 908,910 and 912,914 that face inward, grooves 916,918 face outward, i.e., groove 916 faces right while groove 918 faces left. To place the lid 804 over the body 802, notches 1002,1004 (FIG. 10, below) are placed inside the grooves 916,918 and the lid 804 is slid over the body 802 until the latter is completely covered.

Figure 10:
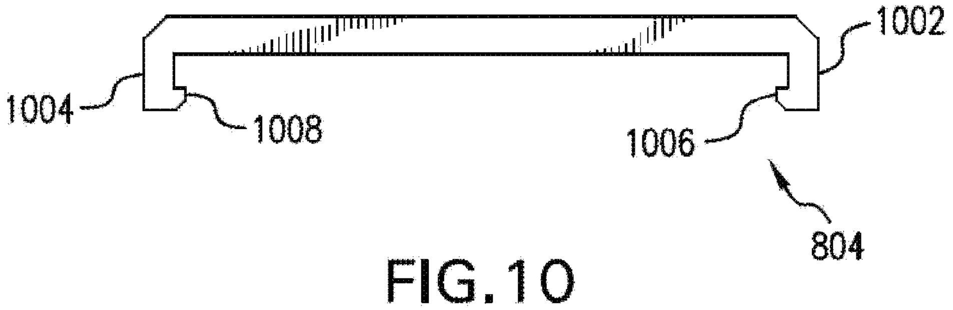
FIG. 10 shows the cross section of the lid of the housing unit.

FIG. 10 shows a cross section, along the 10-10 line of FIG. 8, of the embodiment of the lid 804 shown in FIG. 8. The orientation of the lid 804 in FIG. 10 is the same as the orientation of the body 802 in FIG. 9, and accordingly, the same aforementioned directional language applies.

The walls 1002,1004 of the lid 804 curve inward at the bottom to create notch 1006 on the right, which faces left, and notch 1008 on the left, which faces right. Notches 1002,1004 are configured to fit into the grooves 916,918 to hold the lid 804 in place over the body 802.

Figure 11:
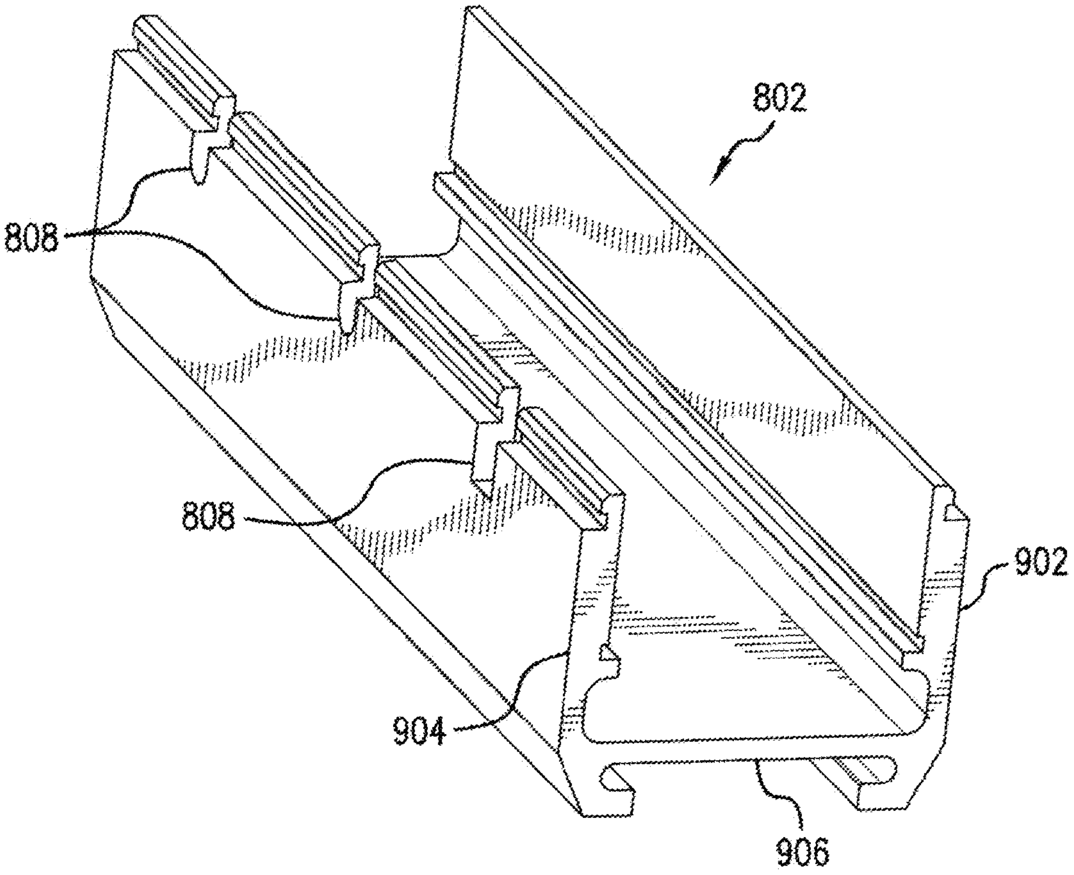
FIGS. 11, 12, & 13 show various perspective drawings of the body of the housing unit.
Figure 12:
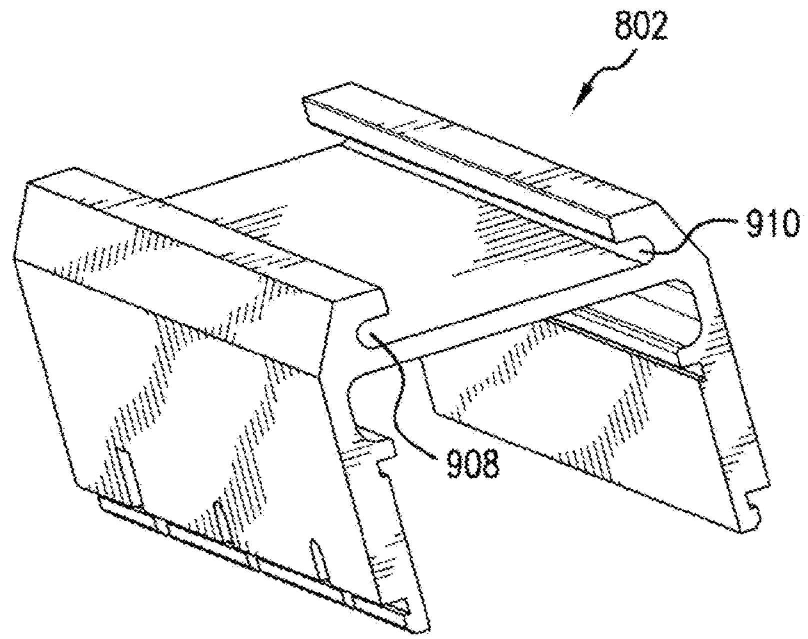
Figure 13:
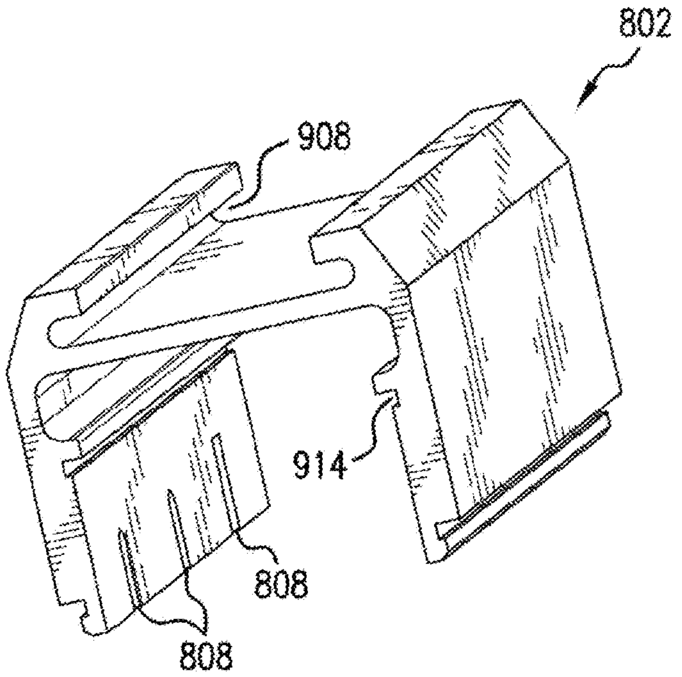
Figure 14:
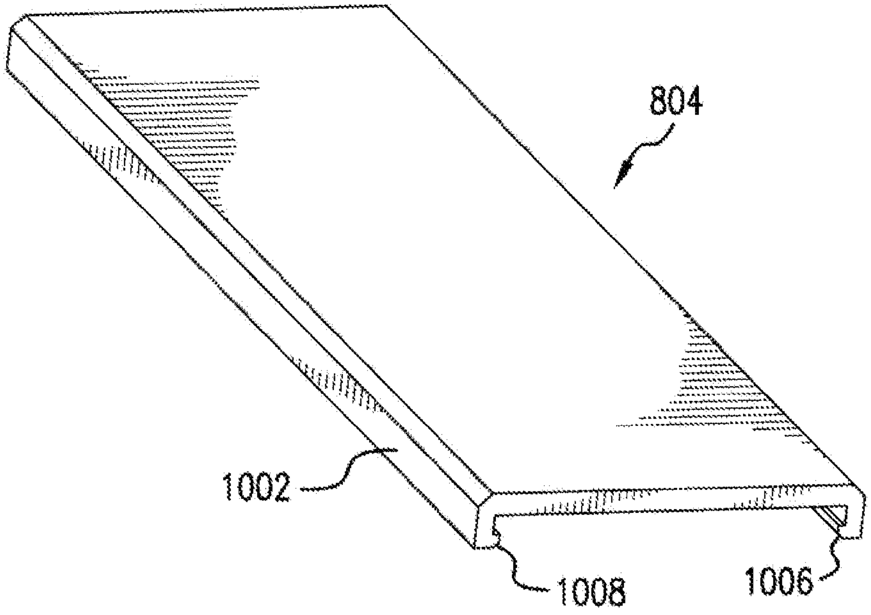
FIGS. 14, 15, & 16 show various perspective drawings of the lid of the housing unit.
Figure 15:
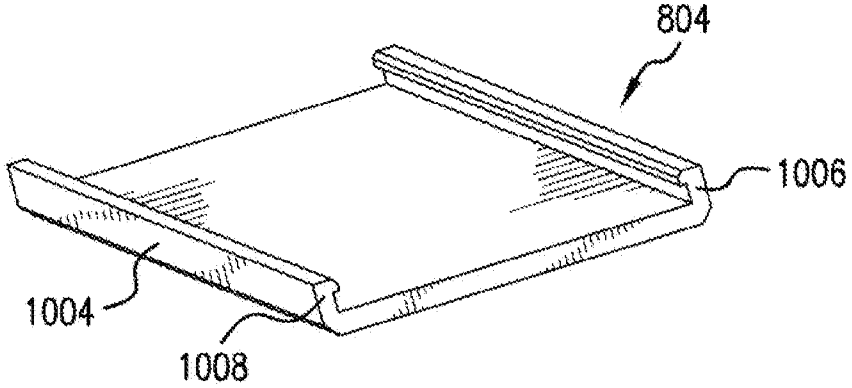
Figure 16:
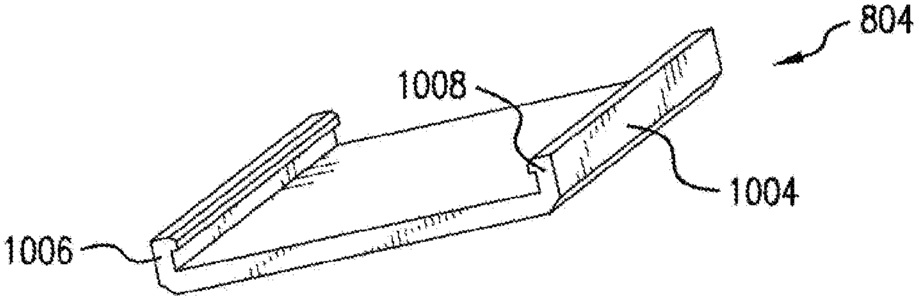

FIGS. 11, 12, & 13 show various perspective views of the body 802, while FIGS. 14, 15, & 16 show various perspective views of the lid 804.

It should be noted that while the components of the housing 800 are described here in terms of their function, their design as shown in FIG. 8 et seq. are purely ornamental. For example, two different designs for the openings 808 are provided, two with round bottoms and one with a square bottom. It is understood that the actual depiction of various components in FIG. 8 et seq. are for purely ornamental reasons.

What is claimed is:

1. A garage door sensor system comprising:

a plurality of transmitter sources configured to transmit an electromagnetic (EM) waveform; and a plurality of receiver sensors configured to receive the electromagnetic waveform from the plurality of transmitter sources, wherein each receiver sensor of the plurality of receiver sensors is configured to receive an EM waveform from a single corresponding transmitter source of the plurality of transmitter sources, wherein the plurality of transmitter sources and the plurality of receiver sensors are configured to share a wired connection to an interface of a garage door motor assembly, and wherein the wired connection is configured to provide both a power and communication connection for the plurality of transmitter sources and plurality of receiver sensors.

2. The garage door sensor system of claim 1, comprising a receive controller and a plurality of receiver circuits, wherein each receiver sensor of the plurality of receiver sensors is electronically coupled to a corresponding receive circuit of the plurality of receive circuits.

3. The garage door sensor system of claim 2, wherein the receive controller is configured to send the blocked beam signal to an interface of a garage door motor assembly indicating that an object is intersecting a spatial surface between the plurality of transmitter sources and the plurality of receiver sensors.

4. The garage door sensor system of claim 2, wherein the receive controller is configured to determine an active duration of the received electromagnetic waveform in a predetermined detection time window for each of the plurality of receive sensors from a single corresponding transmitter source, and wherein the receive controller is configured to send a blocked beam signal based on the determined active duration and the predetermined detection time window.

5. The garage door sensor system of claim 2, wherein the receiver controller is configured to send the blocked beam signal when a ratio of the active duration to a duration of predetermined detection time window is less than a predetermined density detection threshold.

6. The garage door sensor system of claim 2, wherein each receiver circuit comprises a receiver sensor configured to receive the electromagnetic waveform and a microcontroller configured to determine the active duration based on the received electromagnetic waveform.

7. The garage door sensor system of claim 6, wherein the active duration is a period during which the received electromagnetic waveform is at a signal high value.

8. The garage door sensor system of claim 2, wherein each receiver circuit of the plurality of receiver circuits independently comprises at least one of a voltage converter, a micro-controller, an indicator LED, an EM photodetector, or a combination thereof.

9. The garage door sensor system of claim 2, wherein the receiver circuit is configured to synchronize the start of the predetermined detection window based on a synchronization pulse transmitted by the corresponding transmitter source.

10. The garage door sensor system of claim 1, further comprising a transmit controller configured to control each transmitter source of the plurality of transmitter sources such that each transmitter source transmits the electromagnetic waveform during predetermined time intervals of a recurring transmit cycle.

11. The garage door sensor system of claim 10, wherein the transmit controller is configured to control at least one of the plurality of transmitter sources such that the plurality of transmitter sources transmit a plurality of waveforms non-simultaneously, wherein each of the plurality of waveforms is transmitted by a respective one of the plurality of transmitter sources.

12. The garage door sensor system of claim 1, wherein the wired connection is configured to provide power via a low voltage power supply of the garage door motor assembly.

13. A receiver assembly for a garage door sensor system, the receiver assembly comprising a plurality of receive sensors configured to receive an electromagnetic waveform from a plurality of transmitter sources; and a receive controller; and a plurality of receiver circuits, wherein each receiver sensor of the plurality of receiver sensors is electronically coupled to a corresponding receive circuit of the plurality of receive circuits, wherein each receiver sensor of the plurality of receiver sensors is configured to receive an EM waveform from a single corresponding transmitter source of the plurality of transmitter sources, wherein the plurality of receiver sensors are configured to share a wired connection to an interface of a garage door motor assembly, and wherein the wired connection is configured to provide both a power and communication connection for the plurality of transmitter sources and plurality of receiver sensors.

14. The receiver assembly of claim 13, wherein the receive controller is configured to send the blocked beam signal to an interface of a garage door motor assembly indicating that an object is intersecting a spatial surface between the plurality of transmitter sources and the plurality of receiver sensors.

15. The receiver assembly of claim 13, wherein the receive controller is configured to determine an active duration of the received electromagnetic waveform in a predetermined detection time window for each of the plurality of receive sensors from a single corresponding transmitter source, and wherein the receive controller is configured to send a blocked beam signal based on the determined active duration and the predetermined detection time window.

16. The receiver assembly of claim 15, wherein the receiver controller is configured to send the blocked beam signal when a ratio of the active duration to a duration of predetermined detection time window is less than a predetermined density detection threshold.

17. The receiver assembly of claim 13, wherein each receiver circuit of the plurality of receiver circuits independently comprises at least one of a voltage converter, a micro-controller, an indicator LED, an EM photodetector, or a combination thereof.

18. The receiver assembly of claim 13, wherein the receiver circuit is configured to synchronize the start of the predetermined detection window based on a synchronization pulse transmitted by the corresponding transmitter source.

19. The receiver assembly of claim 13, wherein the wired connection is configured to provide power via a low voltage power supply of the garage door motor assembly.

* * * * *